(12) United States Patent
Feldman et al.

(10) Patent No.: US 10,942,532 B2
(45) Date of Patent: Mar. 9, 2021

(54) FLOAT VALVE SYSTEMS AND METHODS FOR CONTROLLING LIQUID LEVEL IN VESSELS

(71) Applicant: COMETFLO LTD., Petach Tikva (IL)

(72) Inventors: Yoseph Feldman, Tel Aviv (IL); Emanuel Mendes, Petach Tikva (IL)

(73) Assignee: COMETFLO LTD., Petah Tikva (IL)

( * ) Notice: Subject to any disclaimer, the term of this patent is extended or adjusted under 35 U.S.C. 154(b) by 0 days.

(21) Appl. No.: 16/790,413

(22) Filed: Feb. 13, 2020

(65) Prior Publication Data

US 2020/0264640 A1 Aug. 20, 2020

Related U.S. Application Data

(60) Provisional application No. 62/806,828, filed on Feb. 17, 2019.

(51) Int. Cl.
*G05D 9/02* (2006.01)
*F16K 31/126* (2006.01)
*F16K 21/18* (2006.01)
B67D 7/36 (2010.01)

(52) U.S. Cl.
CPC .......... *G05D 9/02* (2013.01); *F16K 31/1266* (2013.01); *B67D 7/367* (2013.01); *F16K 21/18* (2013.01); *Y10T 137/7287* (2015.04)

(58) Field of Classification Search
CPC ..... G05D 9/02; Y10T 137/7287; F16K 31/12; F16K 31/1266; F16K 31/165; F16K 21/18; E03D 1/32; E03D 1/302
See application file for complete search history.

(56) References Cited

U.S. PATENT DOCUMENTS 4,607,658 A * 8/1986 Fraser ................. E03C 1/242
137/390

FOREIGN PATENT DOCUMENTS

| CN | 201392036 | 1/2010 |
|----|-----------|--------|
| CN | 201392037 | 1/2010 |
| EP | 0251837   | 1/1988 |

OTHER PUBLICATIONS

International Search Report and Written Opinion for International Patent Application No. PCT/IL2019/051097 dated Dec. 31, 2019, pp. 1-7.

* cited by examiner

*Primary Examiner* — Hailey K. Do
(74) *Attorney, Agent, or Firm* — Wolter Van Dyke Davis, PLLC; Eugene J. Molinelli; Patrick D. Herron

(57) ABSTRACT

A confined, fully or partially liquid-filled container having at least one flexible wall, utilizing the effect of gravity on liquid in the container to generate a force that acts on an actuator mechanism to operate a normally-closed control valve. In preferred embodiments, the container is a simple sealed bag partially liquid-filled and air-free.
The flexible-walled container contains a predetermined quantity of liquid. The bag is confined by walls of a housing formed of a non-flexible material, and is affixed to the housing preferably to an upper wall of the housing in any conventional way. The housing is disposed in a vessel for holding a liquid and is having one or more apertures, which are in fluid communication with the interior of the vessel and through which liquid can enter from the vessel into the housing to a level corresponding to a desired level of liquid in the vessel.

23 Claims, 5 Drawing Sheets

FLOAT VALVE SYSTEMS AND METHODS FOR CONTROLLING LIQUID LEVEL IN VESSELS

FIELD OF THE INVENTION

The present invention, in some embodiments thereof, relates to float valve systems and methods for controlling a liquid level in a vessel. More particularly, but not exclusively, the invention relates to float valve systems and methods for maintaining a desired liquid level in a vessel from which the liquid can selectively be withdrawn by automatically refilling the vessel when the liquid level is reduced to a selected refill level. It further relates to vessels which use such float valve systems. The systems are characterized by simplicity and low cost, long-term reliability, and fail-safe operation. Vessels with which the float valve system of the invention can be used include toilets, hot water tanks, and industrial process vessels of various kinds that require automatic liquid level control.

BACKGROUND OF THE INVENTION

A conventional float valve (sometimes referred to as a ballcock or ball tap), is a mechanism for filling water tanks, such as those found in flush toilets, while avoiding overflow and (in the event of low water pressure) backflow. It consists of a valve which is connected to the incoming water supply and is engaged and disengaged by means of a pivotally mounted lever configured to close and open, respectively. The lever typically comprises a metallic rod, having a hollow sealed float often ball-shaped, mounted on one end, and a second end is placed in proximity to the valve so as to engage it when the water level rises in the tank to a pre-set level, and apply pressure on it to close the valve and shut of the flow of the incoming water. Toward the end of the discharge process, the ballcock mechanism responds to the drop in water level by lowering the float thereby disengaging the second end of the lever from the valve allowing it to open to the incoming water flow refilling the tank to the pre-set level. Should the float or valve fail and allow the water level to exceed the fill line, the water will pour into the overflow tube and out to the bowl. Although this does not stop the wastage of water, it avoids the flooding that would otherwise occur after a single-point valve failure.

These conventional float valves mechanisms must consist of relatively large floats in order to contact the water at a relatively large surface area, so that the rising water in the tank will create sufficient force on the lever to close the valve and shut off the water flow. Thus, conventional float valve mechanisms are cumbersome. They fail at times when the float frictionally engages a wall of the water tank or an overflow tube, preventing the float from rising and closing the valve. Furthermore, since the lever of the ballcock float mechanism is made of corrosive material, it often causes malfunctioning of the mechanism and requires replacement.

Water conservation is becoming more and more important. In response to the need for water conservation, it is imperative that the float valve mechanism is reliable and failsafe to the highest degree. It will be appreciated that water conservation includes prevention of leak failures due to unreliable float valves that may cause waste of large quantities of water in view of their widespread use.

It is therefore a long felt need to provide a float valve mechanism and method of simple construction and small in size, formed with no corrosive materials and requires hardly any maintenance or replacement. And it would be very desirable to have such a device that provides failsafe and reliable operation.

BRIEF DESCRIPTION OF THE SEVERAL VIEWS OF THE DRAWING(S)

Some embodiments of the invention are herein described, by way of example only, with reference to the accompanying drawings, in which.

In the several figures, like parts are given the same reference signs.

DESCRIPTION OF ILLUSTRATIVE EMBODIMENTS OF THE INVENTION

Figure 1:
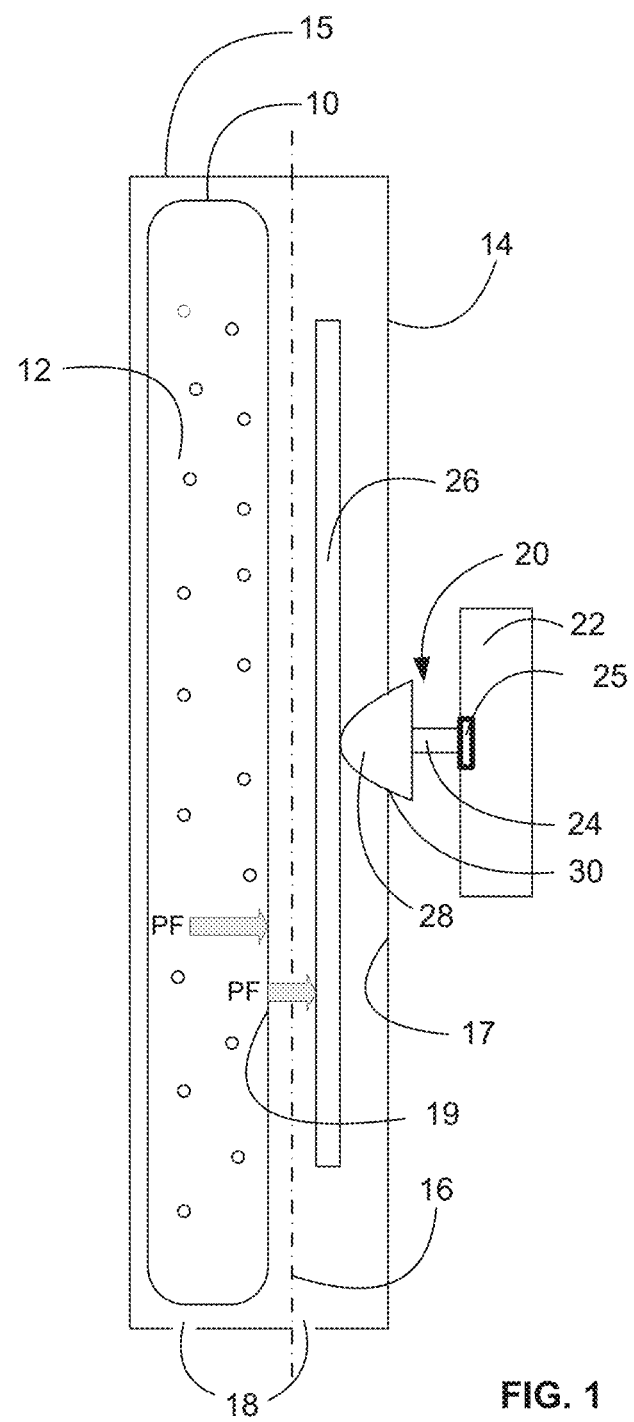
FIG. 1 is a schematic illustration of the physical principles underlying the implementation of the invention.

Introductory Overview:

The float valve systems according to the invention utilize the effect of gravity on liquid in a confined, fully or partially liquid-filled container having at least one flexible wall, to generate a force that acts on an actuator mechanism to operate a normally-closed control valve. In preferred embodiments the container is neither closed nor sealed. In other preferred embodiments, the container is a simple sealed bag partially liquid-filled and air-free. The invention will be described in that context.

The flexible-walled container may comprise, for example, a sealed plastic bag containing a predetermined quantity of liquid. The bag is confined by walls of a housing formed of a non-flexible material, and is affixed to the housing preferably to an upper wall of the housing in any conventional way. In preferred embodiments the housing comprises a single longitudinal wall. The housing is disposed in a vessel for holding a liquid and is having one or more apertures, which are in fluid communication with the interior of the vessel and through which liquid can enter from the vessel into the housing to a level corresponding to a desired level of liquid in the vessel.

The housing is so located that the level of the liquid in the housing bears a desired direct relationship to the level of liquid in the vessel with liquid level in the housing being high when the liquid in the vessel is filled to a desired preset level and falling as liquid is withdrawn from the vessel.

The container affixed in the housing is configured to progressively be immersed in the liquid as the liquid rises in the vessel up to a desired preset level corresponding to the desired preset level of liquid in the vessel from which the liquid can electively be withdrawn, and below a desired preset level of liquid corresponding to "refill needed" level of the liquid in the vessel as the liquid in the vessel drops. It will be appreciated that the container can be configured to be held above and out of the liquid in the vessel.

When the liquid level in the vessel and, in turn, in the housing, is dropping, the buoyant force that the liquid in the vessel exerts on the outside of the container walls immersed in the liquid, is reduced. Furthermore, because the container is confined in the housing it maintains a liquid column of sufficient height so as to exert through gravity a force on the inside of the container walls sufficient to actuate the actuator mechanism to open the control valve. The force difference between the gravity force acting on the liquid inside the container and the reduced buoyant force on the walls of the container on the outside, creates pressure that is exerted on the inside of the container walls. Differently described, the housing is configured to allow the flexible walls of the container to expand and contract laterally due to pressure changes resulting from the combined effect of gravity force acting on the liquid in the container applying pressure to the container walls from inside the container and a buoyant force exerted by the liquid in the housing applying pressure to the container walls from outside the container;

As it is generally known, buoyant force is exerted by liquid that opposes the weight or gravity force of an immersed object. In a column of liquid, pressure increases in the liquid with depth as a result of the weight of the overlying liquid. Thus, the pressure at the bottom of a column of liquid is greater than that at the top of the column.

In particular, when the liquid level in the housing rises, the resulting increase in the buoyant force acting on the outside of the container flexible walls, drives the walls to the non-actuation state which, in turn, closes the control valve. Conversely, as the liquid level in the housing drops the buoyant force acting on the outside of the container walls decreases, and the gravity force on the liquid column in the container exerts pressure on the inside of the container walls, particularly on their lower portion, driving the walls to the actuation state which, in turn, opens the control valve. All in accordance with the Archimedes' principle as is well known.

According to preferred embodiments of the invention, the housing is located inside the vessel. However, if this is not practical for some reason, the housing may be located outside the vessel in fluid communication with its interior.

According to preferred embodiments of the invention, the float valve systems further include a control valve, which is configured to be actuated by an actuator mechanism and is normally closed to ensure failsafe operation of the system. The actuator mechanism may comprise two actuator parts: a first actuator part configured to be moved and retracted and thereby open and close the control valve, respectively, and a second actuator part configured to provide a force required to move and retract the first actuator part that is responsive to the lateral expansion of the at least one flexible container wall. The first actuator part may comprise a spring biased first part in the form of a rigid sliding stem, including a first end portion coupled to a sealing member and a second end portion positioned to be engaged by a second actuator part, wherein the stem is configured to actuate the control valve in the sealed position to the unsealed position. The normally closed condition of the sealing member results from the force of the biasing spring on the stem that keeps it closed. The second actuator part may comprise a substantially flat plate moveably positioned so as to contact at least the lower portion of a flexible wall of the container and engage the second end portion of the stem applying a force required to move and the stem to open the sealing member responsive to the lateral expansion of the flexible wall when the liquid in the vessel is at the "refill needed" level for the vessel. When the buoyant force acting on the container is at a value corresponding to the vessel being at a desired full level, the plate applies no force to the stem allowing it to retract to close the sealing member responsive to the lateral contraction of the flexible wall.

Alternatively, the first actuator part of the actuator mechanism may comprise a rigid sliding stem and a diaphragm coupled to the first end portion of the stem and is configured to actuate the control valve in the sealed position to the unsealed position responsive to pressure exerted on the second end portion of the stem by the plate. The normally closed condition of the diaphragm results from the resilience of the diaphragm that keeps it closed. As is conventional, the control valve includes an inlet connectable to a source of liquid, for example a water main and an outlet connectable so as to be in fluid communication with the interior of the vessel; In some applications, for example, for use with a toilet tank, the actuator mechanism and the control valve may be located inside the tank. In such applications, no separate liquid inlet for the tank is required.

Optionally, in other applications, for example, for use with a hot water storage tank, the actuator mechanism and the control valve may be located outside the vessel with the outlet of the control valve connectable to an inlet port for the vessel by a suitable conduit.

An actuator mechanism responsive to the pressure in the container is provided to open the control valve when necessary. As described above and below, the actuator mechanism includes a first part in the form of a slidable rigid stem, having a first end portion coupled to a sealing member or a diaphragm and an opposite second end portion extending into the housing through a suitable opening and is in operable contact with a second part of the actuator mechanism. The stem is either spring biased when the sealing member is used or biased by the diaphragm.

According to preferred embodiments of the invention, the second part of the actuator mechanism, preferably in the form of a substantially flat plate, is moveably positioned between a flexible wall of the container and an adjacent wall of the housing, which includes an opening. That wall will be referred to below generically as the "adjacent wall". The stem is positioned so that the second end portion of the stem extends from the opening in the adjacent wall configured to be engaged by the plate. In some embodiments, the plate is continually in contact with the wall of the container. It will be appreciated that the plate is moveably positioned so as to contact at least the lower portion of the wall of the container when the liquid in the vessel is at the "refill needed" level for the vessel. In some embodiments the plate may be mounted on the adjacent wall and biased, for example, by a spring mechanism, and may be configured to start moving when the liquid in the housing drops to a predetermined level corresponding to a selected "refill needed" level for the vessel. At that point, the force exerted on the plate by the gravity force on the liquid column inside the container combined with the reduction of buoyant force outside the container becomes sufficient to overcome the biasing forces on the plate and the stem. This allows the plate to move and, in turn, to move the stem to open the control valve.

Conversely, as the vessel is refilled, the level of the liquid in the housing rises and the buoyant force on the container walls increases. This increase in force acting on the outside of the container walls causes the pressure exerted on the plate from inside the container to decrease to less than the biasing forces. As a result, the plate returns to its rest position, allowing the actuator mechanism to return to its rest position thus the control valve to reclose.

In some embodiments, the plate is pivotally attached to the adjacent wall of the housing. In such embodiments, in the rest position the plate may be in contact with the container wall, or slightly spaced from it. Optionally, the plate may be disposed between the container and the adjacent wall without being either biased, mounted or attached to the adjacent wall or any wall of the housing.

In some embodiments, the plate is mounted inside the container and is affixed to the internal surface of a container flexible wall or at least to its lower portion. The plate is further coupled to a first end portion of a lever, the lever being pivotally mounted in the container. The second end portion of the lever sealingly extends outside the container, is disposed adjacent the stem and is configured to operably engage the stem and move it to open the control valve when the flexible wall of the container is moved to a position corresponding to a selected "refill needed" level of the liquid in the vessel, and the force applied to the plate by the wall at this position is transferred to the lever second end portion.

In some embodiments of the invention the valve system for controlling the liquid level in a vessel, includes a container having at least one flexible wall and is at least partially filled with liquid. The system further includes a housing that substantially confines the container and includes at least one aperture that is in fluid communication with the interior of the vessel, so as to allow liquid from the vessel to rise in the housing to a level corresponding to a desired level of liquid in the vessel. The housing is being sized and configured to allow the flexible wall of the container to expand and contract laterally as a result of the combined effect of the pressure exerted on the flexible wall from the inside of the container by the liquid in the container due to the gravity force and the pressure exerted on the flexible wall from the outside of the container by the liquid in the housing due to the buoyant force. The system further includes a normally closed valve having an inlet connectable to a source of liquid and an outlet connectable to be in fluid communication with the interior of the vessel; an actuator mechanism for the valve having a first actuator part configured to be moved and thereby open the valve, and a second actuator part configured to apply a force to move the first actuator part responsive to the lateral expansion of the flexible wall. The second actuator part being configured to apply no force to the first actuator part allowing it to retract when the buoyant force acting on the flexible wall is at a value corresponding to the vessel being at a desired full level and to apply a force sufficient to move the first actuator part to open the valve when the buoyant force acting on the container is at a value corresponding to the vessel needing to be refilled.

The invention also provides a method of controlling the liquid level in a vessel that utilizes the combined effect of gravity and buoyant forces on an affixed, confined, fully or partially liquid-filled, flexible-walled, hermetically sealed air-free container and Archimedes' principle to generate a force that acts to operate a normally-closed control valve.

The method involves affixing to a housing and confining thereby, a fully or partially liquid-filled container having at least one flexible wall and preferably free of air; locating the housing in fluid communication with the interior of a vessel so that liquid from the vessel can enter the housing whereby the liquid level in the housing varies in a direct relationship to the level of liquid in the vessel; providing an actuator mechanism for a control valve having a sealing member or a diaphragm in a sealing rest position, that can operate to open the control valve when the combined effect of gravity force on the liquid in the container on the inside of container walls and buoyant force of the liquid in the housing on the outside of the container walls, is such that the pressure from the inside out on the container at least one flexible wall creates a force sufficient to overcome the force that is biasing the actuator mechanism and the sealing member or diaphragm in its sealing position; and allowing the actuator mechanism to return to an inoperative rest position and the sealing member or diaphragm to its sealing position when the pressure due to the combined effect of the gravity force on the liquid in the container on the inside of at least one flexible wall of the container and buoyant force of the liquid in the housing on the outside of the wall, is such that the force from the outside in on the container wall is smaller than the force that is needed to overcome the biasing of the actuator mechanism and the sealing member or diaphragm in its sealing position.

Unless otherwise defined, all technical and/or scientific terms used herein have the same meaning as commonly understood by one of ordinary skill in the art to which the invention pertains. In case of conflict, the patent specification, including definitions, will control. In addition, the materials, methods, and examples are illustrative only and are not intended to be necessarily limiting.

DETAILED DESCRIPTION OF EMBODIMENTS OF THE INVENTION

FIG. 1 illustrates the principles underlying the float valve systems and methods according to the present invention. Essentially, the system comprises a flexible-walled container 10 at least partially filled with a liquid 12. Optionally, container 10 may be completely filled to a point where its walls can at least partially flex. Preferably, after the liquid is placed in the container the air left in it is discharged and the container is sealed and free of air. Container 10 is disposed in housing 14. It will be appreciated that container 10 may be hung from upper wall 15 of housing 14 or affixed in any conventional manner, oriented in the vertical position. Optionally, container 10 is mounted in a confined manner in an elongated housing 14 as shown in FIG. 1, such that it remains vertically stationary at all times.

Typically, housing 14 is configured to be installed in a vessel the liquid level in which is to be controlled (not shown), with the housing axis of elongation 16 oriented vertically in the vessel. The housing may be attached to a wall of the vessel or may be at a location spaced from the vessel walls and supported in place by a bracket or in any other suitable manner. According to an embodiment, housing 14 may be a closed structure except for one or more apertures 18 in fluid communication with the liquid in the vessel allowing liquid from the vessel to flow freely in and out of the housing as the level of liquid in the vessel rises and drops. Consequently, the container is immersed in liquid to a degree which varies according to the liquid level in the vessel.

Alternatively, the housing may include only 2 sidewalls coupled to each other in a manner that holds and confines container 10 there between. Still, alternatively, the housing may comprise a single non-flexible sidewall wherein this sidewall comprises simultaneously a wall of the container. The other wall or walls of the container are flexible walls, as will be described below in detail.

Preferably, the container is disposed in the housing in such manner that it is not free to move, or move only slightly, vertically in response to the buoyant force and/or gravity force acting on it. Thus, the combined effect of gravity and buoyant forces determines the pressure that is being built on the container walls.

Figure 2A:
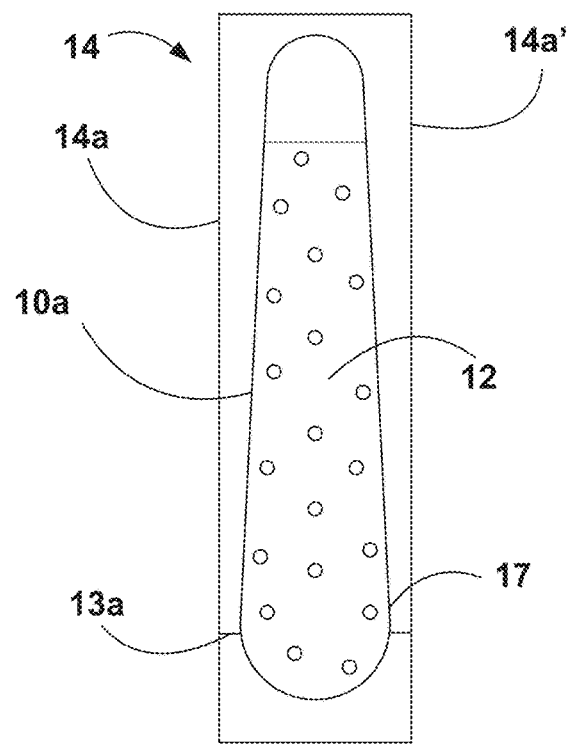
FIG. 2A through 2B illustrate the effect of the underlying physical principles on the component that detects changes in the liquid level in the vessel.
Figure 2B:
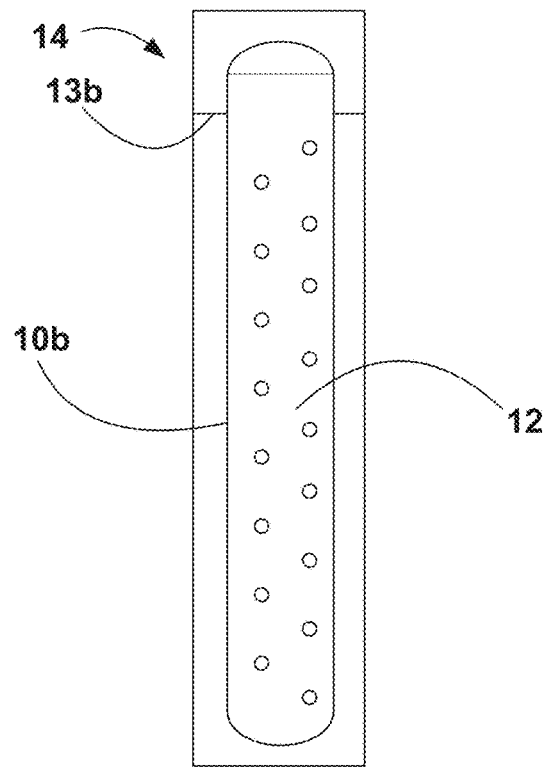

Due to the confinement of container 10 by housing 14, as the level of the liquid in the housing drops the buoyancy force on the outside of the walls of the container is reduced, and the force of gravity creates a pressure force "PF" by the liquid inside the container on the inside of the container walls, particularly the lower portions of the walls. FIGS. 2A and 2B illustrate this effect in case of a container bag that is only partially liquid-filled.

FIG. 2A (in which valve actuator mechanism 20 and plate 26 as described below, and apertures 18 in the housing bottom as described above, have been omitted for simplicity), shows a container bag 10a confined between walls 14a and 14a' of housing 14 when the level of liquid in the vessel (not shown), and the corresponding level of liquid 13a in housing 14 is at a minimum desired level, i.e., at which the vessel is to be refilled. At this level, bag 10a assumes an asymmetric shape, narrower at the upper portion and wider at the bottom portion. This configuration is brought about because bag 10a is minimally immersed or mostly or completely disposed above the level of liquid 13a in housing 14, and as a result, the buoyant force on the outside of the container walls is minimal (or non-existent) and the force of gravity acting on the liquid 12 inside the bag is applying pressure to the inside of the container walls, causing the lower portion 17 of bag 10a to expand. Consequently, the pressure of the liquid built in bag 10a and of the resulting force on the lower portion of the bag walls is at a maximum. As will be understood, the higher the volume of liquid in bag 10a, the less pronounced will be the asymmetric effect, but the resulting internal pressure will still depend on the level of liquid 13a in the housing.

FIG. 2B illustrates the shape of a bag 10b when the liquid level in the vessel, and the corresponding level of the liquid 13b in housing 14 indicate that the liquid in the vessel has reached a desired level. Bag 10b is then substantially or completely immersed and the buoyant force acting on the outside of the container walls is at its maximum and effectively reduces the pressure on the inside of the container walls of the bag. Since the pressure is substantially uniform over the entire length of the bag, it assumes a substantially symmetric shape, with its side walls substantially parallel.

It will be appreciated that housing 14 may be sized and configured to confine container 10a (or 10b) in such manner that when the liquid in the vessel has reached the lowest desired level the liquid 12 is maintained at a sufficiently high level in the container so as to generate sufficient pressure on the inside of the container walls that is required to actuate the actuator mechanism (as will be described below). It will also be appreciated that container 10a (or 10b) may have an open upper portion but sized and configured to hold liquid 12 in the container when the liquid is at level 13a or 13b and there between.

Referring again to FIG. 1, it may be understood that the pressure variation and the flexibility of the walls of container 10 as described above results in a variable force, which can be transferred to an actuator mechanism 20 via a plate 26 that opens a normally-closed control valve 22 to refill the vessel to the needed level, in the manner described below.

Container 10 may be formed of a suitably durable plastic such as polyethylene, silicone, nylon formed into a sealed bag. The bag may be formed of two sheets of the plastic material sealed together on three sides by welding or by an adhesive then similarly sealed on the fourth side after being filled with a desired amount of liquid and freed of air. Alternatively, the bag may be formed of a single sheet folded at its center to form the bottom edge of the bag, sealed along its opposed side edges and then sealed along the other edge after being filled. Thus, according to both alternatives the container comprises 2 walls. As a further alternative, the bag may be formed of an extruded tube of flexible material and then sealed at it open end after being filled and freed of air. As yet another alternative, the bag may be sealed on three sides and have an open upper end but sized and configured to hold the liquid at any level of liquid in the housing according to the present invention. As still a further alternative, the bag may have a first wall formed of non-flexible material which preferably is a wall of the housing and a second wall formed of flexible material sealed at least on three sides.

Diaphragm are suitable for use in actuator mechanisms for control valves according to the invention because they are easily designed to be normally closed due to the resilience of the diaphragm and to be remotely operated by a simple mechanical actuator such as the stem. Alternatively, any other type of actuator mechanism that can be similarly designed and operated, for example, a sealing element coupled to a first end portion of the biased stem, the sealing element being configured to seal the opening of the control valve in the rest position, wherein the second end portion of the stem is configured to being driven so as to cause the sealing member to operate the control valve in any manner as known in art, thus permitting flow of liquid into the vessel (as will be described in detail below).

As will be appreciated, that in order to scale down the float valve systems according to the present invention, an actuating mechanism is used to operate a control valve, wherein the former actuates the latter as known in the art. Where size of the float valve systems need not be minimized, the actuating mechanism according to the present invention may comprise a valve that is large enough to accommodate a flow rate sufficient to fill a vessel of a given size at a reasonable pace.

Conceptually, actuator mechanism 20 illustrated in FIG. 1 is constructed of a stem 24 which includes a first end portion 23 coupled to a resilient diaphragm 25 and an second end portion 28 that extends through an opening 30 formed in adjacent wall 17 of housing 14 so as to come in operable contact with a force transfer plate 26 disposed in housing 14, when a wall 19 of container 10 adjacent the plate engages it and applies PF to it.

Stem 24 is operable to engage and move resilient diaphragm 25 to open control valve 22. When the liquid in housing 14 drops below a preselected level, wall 19 engages plate 26 and applies pressure force to it. In turn, the force applied to plate 26 is transferred to stem 24 when the plate engages the stem second end portion 28. The force of plate 26 moves stem 24, whereby first end portion 23 depresses in turn the diaphragm, which in turn opens control valve 22.

Force transfer plate 26 is suitably mounted in housing 14 so that it can be engaged by wall 19 of container 10 and move in response to the pressure it applies. Optionally, plate 26 is biased, for example, by a spring mechanism (shown in FIG. 3) or by the inherent resilience of a material which it may be formed of. Only when the buoyant force is at its minimum and the force of gravity acting on the liquid 12 inside the bag is applying pressure to the inside of the container walls, the force necessary to cause actuator mechanism 20 to operate the control valve is available. As will be understood, this occurs when it is necessary to open control valve 22 and in turn refill the vessel through the valve. An alternative implementation of actuator mechanism 20 is described below in connection with FIG. 3.

Figure 3:
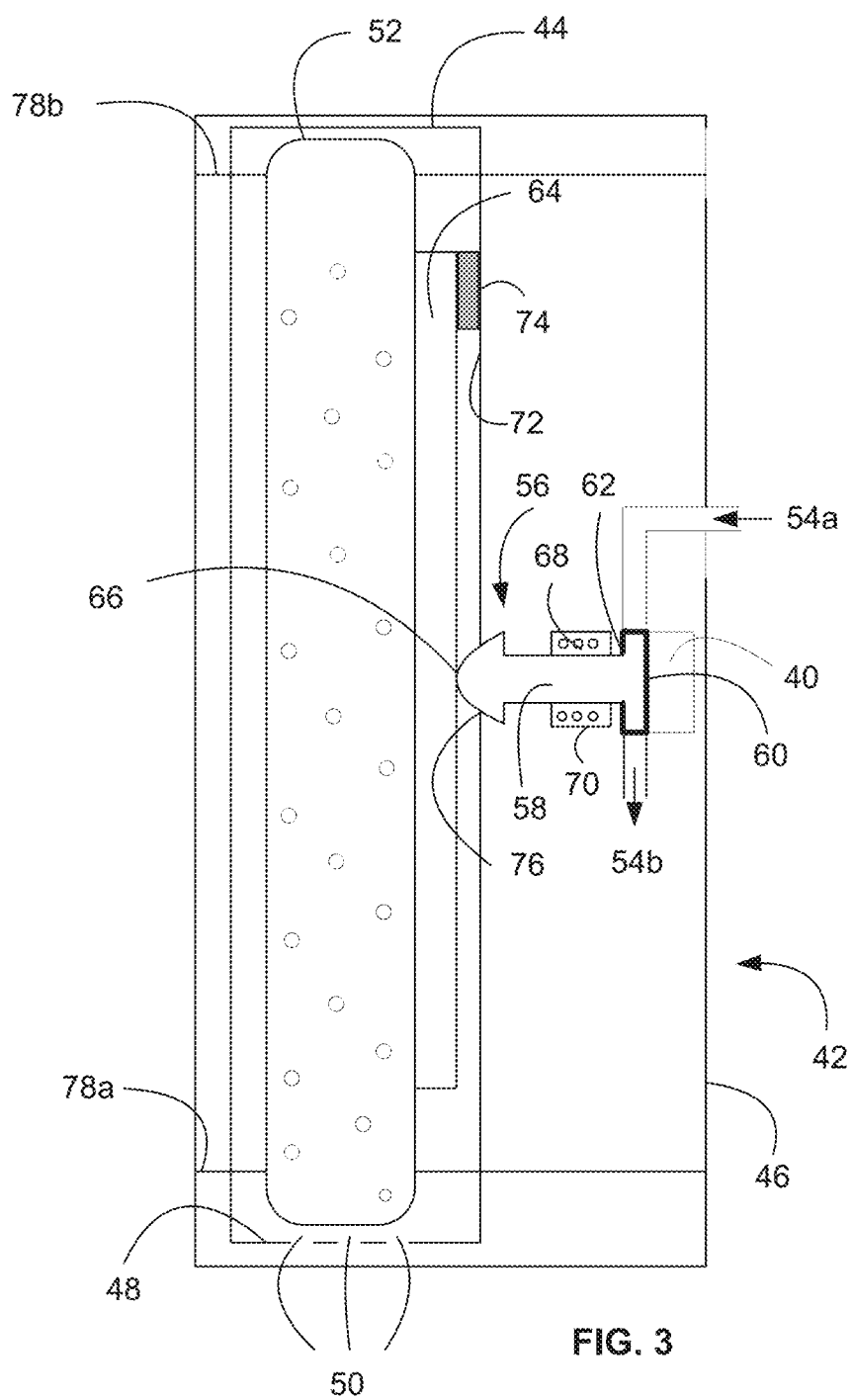
FIG. 3 is a schematic illustration of an embodiment of the invention utilizing the principles described in connection with FIGS. 1, 2A, and 2B.

FIG. 3 illustrates schematically a practical implementation of a valve system according to the principles illustrated in FIGS. 1, 2A, and 2B in which control valve 40 is located inside a vessel such as the tank 42 of a conventional toilet. It should be recalled, however, as noted above, that embodiments in which the control valve and the actuator mechanism are outside the vessel are also within the scope of the invention.

For the illustrated embodiment, inside tank 42, there is located a vertically oriented housing 44 supported by a mounting bracket (not shown) or other suitable means in spaced relation to the walls 46 of the tank. The bottom end wall 48 of housing 44 includes one or more apertures 50 of sufficient area to allow free flow of water from the tank into and out of the housing.

The thickness of the plastic material forming the bag will depend on the type of material. The amount of liquid contained in the bag will depend on its viscosity and specific weight. Preferably, the liquid is non-volatile having high viscosity, such as silicon oil. Such liquid is preferable as it slows down the change in pressure on the walls of the bag, thus delaying the reaction of opening and closing of the control valve as function of the rise and fall of the level of liquid in the housing and avoiding rapid oscillation of the valve. In an embodiment of the invention a device may be disposed in the bag, configured to externally control the passage of the liquid in it from one part to another in response to the changing level of the liquid in the housing. Such control of the liquid flow rate may control the speed of the opening and closing of the control valve and avoid rapid oscillation of the valve.

If the liquid in the container is water having a specific gravity of 1 g per mil., for example, the container may be filled with water in the range of about 15 ml. to about 30 ml., for example, about 20 ml. The same range can be used when the liquid in the container is silicon oil having a specific gravity of 0.9 g per ml. The container may comprise a bag, for example, of polyethylene sheet material or silicone based material.

Figure 4:
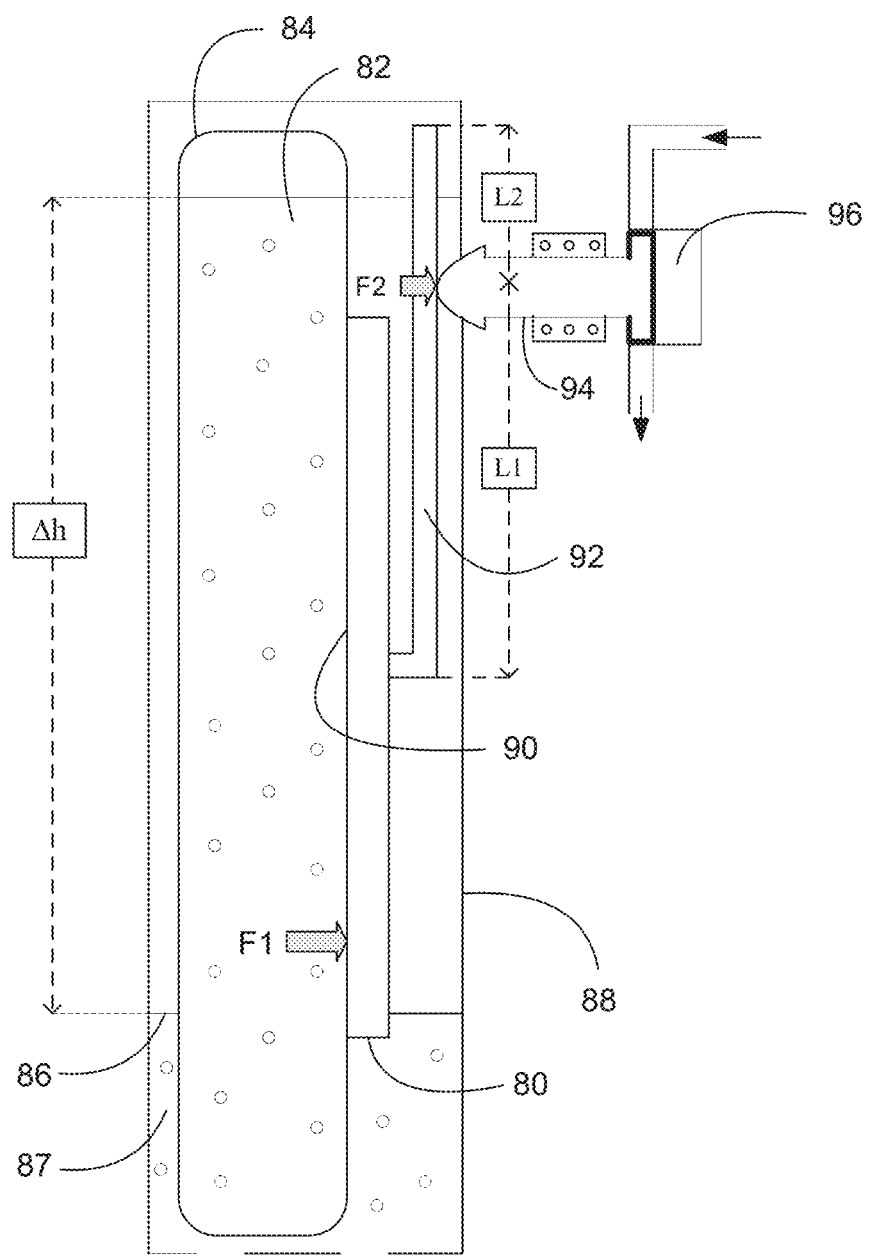
FIG. 4 is a schematic illustration of an embodiment of the invention utilizing the principles described in connection with FIGS. 1, 2A, and 2B and 3.

A sealed bag 52 formed of polyethylene film as described above having a thickness of 0.2 mm-0.5 mm, or in case bag 52 is formed of a silicone film having a thickness of 0.8-0.9 mm and partially filled with water, is confined in housing 44. It will be appreciated by those skilled in the art that polyethylene film and silicone film can be manufactured according to different "Shore Hardness", which determine the elasticity (or flexibility) of a film of a desired thickness. Preferably, bag 52 is formed of silicone film having 20-40 Shore Hardness or of polyethylene film of the same thickness and Shore Hardness. It will be appreciated that the lower the Shore Hardness of the film it can be thicker yet provide the same degree of elasticity. Preferably, bag 52 according to an embodiment of the present invention when partially filled with liquid forms a "pillow" shape. The housing 44 is sized so that it can accommodate a bag 52 of a height preferably 70-80 mm, and as shown in FIG. 4, is adapted and configured to maintain at least a height H of liquid (82) in the container (84) above the liquid level (86) of the liquid in the housing (88) is at its "refill needed", width (not shown) preferably of 70-80 mm and depth preferably of 10-15 mm when the bag is filled with liquid. When the liquid level in the bag reaches its upper extreme or in close proximity thereto, maximum emersion of the bag is represented, i.e., a full tank, and when the liquid level in the bag reaches its lower extreme or in close proximity thereto minimal emersion of the bag is represented, i.e., the level of liquid in the tank at which the tank needs to be refilled. The bag is sized such that it can contain up to 50 ml. of liquid when completely filled.

Control valve 40 includes an inlet port 54a configured for connection in a conventional manner to the water supply for a building and an outlet port 54b in fluid communication with the interior of tank 42. Operatively coupled to control valve 40 is actuator mechanism generally indicated at 56. The actuator mechanism comprises the following components: a stem 58 that is operative to displace a sealing member 60 mounted on a first end portion 62 of stem 58 and disposed in control valve 40, from its normally closed position when necessary to refill tank 42; a plate 64 operative to push against a second end portion 66 of stem 58 when the valve needs to be opened; and a spring 68 seated in a housing 70 and biasing stem 58. Plate 64 is attached to housing wall 72 at one end by a spring hinge 74 that maintains it at a rest position where it applies no pressure on stem 58 when tank 42 is full and the buoyant force of the water in the tank reduces the pressure on the outside of the walls of bag 52 to minimum.

Second end portion 66 of stem 58 distal to valve 40 extends through an opening 76 in wall 72 of housing 44. When the sealing member 60 is in its normally closed position, stem 58 is at a rest position such that its second end portion 66 is just in contact with, or, optionally, just out of contact with plate 64 when it, too, is in its rest position.

As explained above, when the buoyant force is at its minimum (for example, when the water in tank 42 is at level 78a and the tank needs to be refilled) the liquid in bag 52 applies increased pressure to plate 64. This pressure is sufficient to overcome the spring force of hinge 74 and of spring 68 and move stem 58. Stem 58 in turn moves sealing member 60 to its open position, allowing the tank to be refilled through valve outlet port 54b.

It will be appreciated that in an embodiment according to the present invention, alternatively a diaphragm instead of sealing member 60 may be disposed in control valve 40 and stem 58 may be configured to push the diaphragm to open the control valve. In this embodiment the diaphragm may bias stem 58 to its rest position.

When the tank has been refilled, for example, when the water in it is at a level 78b, the buoyant force increases to the point that the pressure exerted on plate 64 by bag 52 is no longer sufficient to overcome the forces of hinge 74 and spring 68, stem 58, sealing member 60 and plate 64 return to their respective rest positions and the valve closes.

In some applications, for example, in which tank 42 is a water heater tank, it may be preferable to locate valve 40 outside of the tank. For such applications, housing 44 and bag 52 will generally still be located in tank 42 along with plate 64 and an extension of stem 58. However, for stem 58 to engage plate 64, it must now also pass through a sealed opening (not shown) in the wall of the tank, as well as through the opening 76 in housing wall 72. In addition, of course, the outlet of the valve will be connected to an inlet port of the tank by a suitable conduit.

As illustrated in FIG. 4 (in which the vessel has been omitted for simplicity), and as will be understood by those skilled in the art, the force $F_1$ applied to force transfer plate 80 is determined according to the following relationship:

$$F_1 = \Delta h \times W_{(specific\ weight)} \times A_{(effective)}$$

wherein $\Delta h$ is the height of the liquid 82 in container 84 above the level 86 of the liquid 87 in housing 88, W is the specific weight of the liquid 82 inside container 84 and A is the effective area to which $F_1$ is applied, i.e. the area of the plate 80 in contact with container wall 90 plus an additional area to which wall 90 extends to over the plate 80 due to the flexibility of the wall. According to the illustrated embodiment, F1 in turn is applied to lever 92 by plate 80.

Correspondingly, a force $F_2$ is applied to stem 94 by lever 92 for opening control valve 96, which is determined according to the following relationship:

$$F_2 = (L_1/L_2) \times F_1$$

wherein F1 is the force applied to plate 80 and L1/L2 is the moment of force that lever 92 applies to stem 94.

In yet other applications, it may be preferable to locate housing 88 and bag 84 outside the tank, along with control valve 96, in a separate outer housing with suitable fluid communication provided to the tank. In such an application, it will be understood that the various operating parameters discussed above and the location and dimensions of the various parts will be chosen to achieve the desired functionality in a manner that will be apparent to those skilled in the art.

Figure 5:
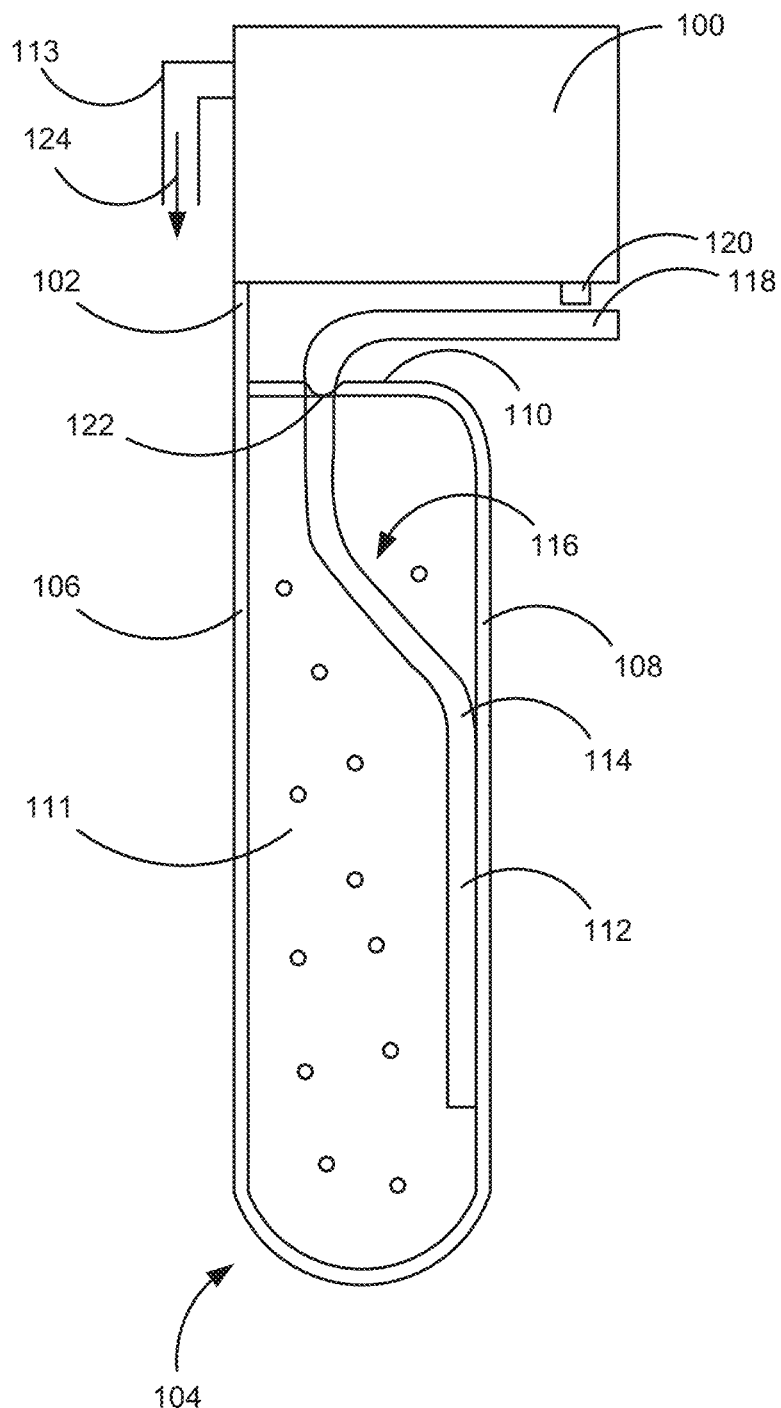
FIG. 5 is a schematic side view illustration of an embodiment of the invention utilizing the principles described in connection with FIGS. 1, 2A, and 2B, 3 and 4.

FIG. 5 illustrates a schematic side view illustration of an embodiment of a practical implementation of a valve system according to the principles illustrated in FIGS. 1, 2A, 2B, 3 and 4 and described above, in which a normally closed control valve 100, an actuator mechanism comprising plate 112 and lever 116, a housing 102 and container 104 are schematically illustrated (the vessel has been omitted for the sake of simplicity). Housing 102 comprises a single wall 106 preferably formed of non-flexible material and configured to be affixed to a vessel in fluid communication with the interior of the vessel through which liquid can enter from the vessel into the housing to a level corresponding to a desired level of liquid in the vessel. The housing being progressively immersed in the liquid in the vessel as the liquid rises in the vessel. Container 104 that is formed of two longitudinal sidewalls and an upper wall, is utilizing wall 106 as a first sidewall and a flexible sidewall 108 as a second sidewall. The lower ends of sidewall 108 and wall 106 are sealingly coupled and the upper ends of sidewall 108 and upper end of wall 106 are coupled forming an upper wall 110 of the container. Sidewall 108 is coupled to wall 106 in any conventional manner. Optionally, upper wall 110 may be formed of non-flexible material.

Container 104 is at least partially filled with a liquid 111. Optionally, as described above, the container may be completely filled to a point where sidewall 108 can at least partially expand and contract laterally as a result of the combined effect of the pressure exerted on sidewall 108 from the inside of the container by the liquid in the container due to the gravity force and the pressure exerted on sidewall 108 from the outside of the container by the liquid in the housing due to the buoyant force. Optionally, container 104 is air-free and sealed. Optionally, container 104 is mounted in a confined manner in housing 102 as shown in FIG. 5, maintaining longitudinal stationary orientation at all times. Optionally, stem 120 is biased. As is conventional, the valve having an inlet (not shown) connectable to a source of liquid and an outlet 113 connectable to be in fluid communication with the interior of the vessel (not shown);

Operatively coupled to control valve 100 is an actuator mechanism comprising a stem 120 that is operative to displace a sealing member (not shown), from its normally closed position when necessary to refill the vessel, and a plate 112 comprising a lever 116 operative to push against stem 120 when the valve needs to be opened. Optionally, stem 120 is biased. In this embodiment, plate 112 is disposed inside container 104 and is affixed to the internal surface of sidewall 108 or at least to the lower portion of sidewall 108. A first end portion 114 of lever 116 is affixed to plate 112.

Optionally, the lever is integrally formed with the plate. A second end portion 118 of lever 116 is disposed adjacent stem 120 and is configured to push on it to open the control valve. Lever 116 extends through upper wall 110 and is configured being pivotally coupled to upper wall 110 configured to rotate about an axis 122 formed in the upper wall, whereby end 118 operably engages stem 120 and moves it to open control valve 100 and allow liquid 124 to flow into the vessel (not shown) when the liquid in the vessel corresponds to a selected "refill needed" level. As described above, at this level of liquid in the vessel, the force created by the combined effect of the gravity and buoyant forces on sidewall 108 causes it to expand laterally and move plate 112, which in turn causes lever 116 to rotate about axis 122, whereby second end portion 118 of the lever engages and presses on stem 120 to open the valve. When the liquid in the vessel is filled to a desired preset level, as described above, the force created by the combined effect of the gravity and buoyant forces on sidewall 108 causes it to contract laterally. As a result, the force applied to plate 112 from inside the container decrease to less than the biasing force of stem 120 and the sealing member, allowing plate 112 to move and in turn lever 116 to rotate, whereby stem 120 to move, to their respective rest positions thus allowing valve 100 to close.

As shown in FIG. 5, in this embodiment the lever is configured in a hook-like shape. It will be appreciated by skilled in the art that lever 112 can be configured in other shapes to perform the same function. Also as shown in FIG. 5, axis 122 is an integrated axis formed in upper wall 110. It will be appreciated by skilled in the art that axis 122 can be constructed and configured in any conventional way.

General Comments:

The terms "comprises", "comprising", "includes", "including", "having" and their conjugates mean "including but not limited to".

As used herein, the singular form "a", "an" and "the" include plural references unless the context clearly dictates otherwise.

Whenever a numerical range is indicated herein, it is meant to include the stated range limits and any value (fractional or integral) within the indicated range. In this connection, the term "about" with respect to parameter values refers to ±10%.

The section headings used herein are intended only as informative and as a convenience for the reader, and they should not be construed as limiting the scope of the description in any way.

Although the invention has been described in conjunction with specific embodiments thereof, it is evident that many alternatives, modifications and variations will be apparent to those skilled in the art. Accordingly, it is intended to embrace all such alternatives, modifications, and variations that fall within the spirit and broad scope of the appended claims.

What is claimed is:

1. A valve system for controlling a liquid level in a vessel, comprising:
   a container comprising at least one flexible wall and is at least partially filled with liquid;
   a housing substantially confining the container, the housing comprising at least one aperture in fluid communication with an interior of the vessel through which liquid can enter from the vessel into the housing to a level corresponding to a desired level of liquid in the vessel, the housing being sized and configured to allow said at least one flexible wall of the container to expand and contract laterally resulting from a combined effect of a pressure exerted on said at least one flexible wall from an inside of the container by the liquid in the container due to a gravity force and a pressure exerted on said at least one flexible wall from an outside of the container by the liquid in the housing due to a buoyant force;

a normally closed valve comprising an inlet connectable to a source of liquid and an outlet connectable to be in fluid communication with the interior of the vessel;

an actuator mechanism for the normally closed valve comprising a first actuator part configured to be moved and retracted thereby opening and closing the normally closed valve, respectively, and a second actuator part configured to apply a force to move the first actuator part responsive to a lateral expansion and a lateral contraction of said at least one flexible wall;

the second actuator part being configured to apply no force to the first actuator part allowing the first actuator part to retract when the buoyant force acting on said at least one flexible wall is at a value corresponding to the vessel being at a desired full level, and to apply a force sufficient to move the first actuator part to open the normally closed valve when the buoyant force acting on the container is at a value corresponding to the vessel needing to be refilled.

2. The valve system for controlling a liquid level in a vessel according to claim 1, wherein the container is a plastic bag.

3. The valve system for controlling a liquid level in a vessel according to claim 1, wherein at least one wall of the housing is formed of a non-flexible material, and the container is affixed to the housing.

4. The valve system for controlling a liquid level in a vessel according to claim 1, wherein the housing comprises a wall adjacent the at least one flexible wall of the container said wall comprising an opening.

5. The valve system for controlling a liquid level in a vessel according to claim 1, wherein the normally closed valve is a normally closed diaphragm.

6. The valve system for controlling a liquid level in a vessel according to claim 1, wherein the actuator mechanism and the normally closed valve are located inside the vessel.

7. The valve system for controlling a liquid level in a vessel according to claim 1, wherein the actuator mechanism and the normally closed valve are located outside the vessel with the outlet of the normally closed valve connectable in fluid communication with the interior of the vessel.

8. The valve system for controlling a liquid level in a vessel according to claim 1, wherein the first actuator part of the actuator mechanism is a rigid sliding stem.

9. The valve system for controlling a liquid level in a vessel according to claim 8, wherein the rigid sliding stem is biased and comprises a first end portion coupled to a sealing member and a second end portion positioned to be engaged by the second actuator part.

10. The valve system for controlling a liquid level in a vessel according to claim 9, wherein the second actuator part of the actuator mechanism comprises a substantially flat plate moveably positioned so as to contact at least a lower portion of the at least one flexible wall of the container and engage the second end portion of the rigid sliding stem applying a force required to move the rigid sliding stem to open the sealing member responsive to the lateral expansion of the at least one flexible wall when the liquid in the vessel is at a "refill needed" level for the vessel, and when the buoyant force acting on the container is at the value corresponding to the vessel being at the desired full level, applying no force to the rigid sliding stem allowing the rigid sliding stem to retract to close the sealing member responsive to the lateral contraction of the at least one flexible wall.

11. The valve system for controlling a liquid level in a vessel according to claim 10, wherein the substantially flat plate is further moveably positioned between the at least one flexible wall of the container and an adjacent wall of the housing, and the rigid sliding stem is positioned so that the second end portion of the rigid sliding stem extends from the opening in the adjacent wall and is configured to be engaged by the substantially flat plate.

12. The valve system for controlling a liquid level in a vessel according to claim 10, wherein the substantially flat plate is mounted on an adjacent wall and is configured to start moving when the liquid in the housing drops to a predetermined level corresponding to a selected "refill needed" level for the vessel, and in turn, move the rigid sliding stem to open the normally closed valve.

13. The valve system for controlling a liquid level in a vessel according to claim 12, wherein the substantially flat plate is pivotally attached to the adjacent wall of the housing.

14. A valve system for controlling a liquid level in a vessel, comprising:

a housing comprising a single wall configured to be affixed in fluid communication with an interior of the vessel through which liquid can enter from the vessel into the housing to a level corresponding to a desired level of liquid in the vessel;

a container at least partially filled with a liquid and comprising the single wall of the housing as a first sidewall and a flexible wall as a second sidewall, wherein lower ends of said first and second sidewalls are sealingly coupled and upper ends of said first and second sidewalls are coupled forming an upper wall of the container, and wherein said second sidewall is allowed to expand and contract laterally resulting from a combined effect of a pressure exerted on said second sidewall from an inside of the container by the liquid in the container due to a gravity force and a pressure exerted on said second sidewall from an outside of the container by the liquid in the housing due to a buoyant force;

a normally closed valve comprising an inlet connectable to a source of liquid and an outlet connectable to be in fluid communication with the interior of the vessel;

an actuator mechanism for the normally closed valve comprising a first actuator part configured to be moved and retracted thereby open and close the normally closed valve, respectively, and a second actuator part configured to apply a force to move the first actuator part responsive to a lateral expansion and a lateral contraction of the second sidewall;

the second actuator part being configured to apply no force to the first actuator part allowing the first actuator part to retract when the buoyant force acting on said flexible wall is at a value corresponding to the vessel being at a desired full level, and to apply a force sufficient to move the first actuator part to open the normally closed valve when the buoyant force acting on the container is at a value corresponding to the vessel needing to be refilled.

15. The valve system for controlling a liquid level in a vessel according to claim 14, wherein the container is mounted in a confined manner in the housing maintaining longitudinal stationary orientation.

16. The valve system for controlling a liquid level in a vessel according to claim 14, wherein the first actuator part of the actuator mechanism is a rigid sliding stem that is operative to open the normally closed valve when necessary to refill the vessel.

17. The valve system for controlling a liquid level in a vessel according to claim 14, wherein the upper wall comprises an axis.

18. The valve system for controlling a liquid level in a vessel according to claim 17, wherein the axis is integrally formed with the upper wall.

19. The valve system for controlling a liquid level in a vessel according to claim 14, wherein the second actuator part of the actuator mechanism comprises a lever and a plate, wherein a first end portion of the lever is coupled to the plate and a second end portion of the lever is operatively disposed adjacent a rigid sliding stem and is operative to push against the rigid sliding stem to open the normally closed valve.

20. The valve system for controlling a liquid level in a vessel according to claim 19, wherein the lever is integrally formed with the plate.

21. The valve system for controlling a liquid level in a vessel according to claim 19, wherein the lever comprises a hook shape.

22. The valve system for controlling a liquid level in a vessel according to claim 19, wherein the plate is disposed inside the container and affixed to an internal surface of the second sidewall, and the lever extends through the upper wall and is pivotally coupled thereto, wherein the lever is configured to rotate about an axis operably engaging the rigid sliding stem.

23. A method of controlling a liquid level in a vessel from which liquid can be withdrawn, comprising:
   confining a container in a housing, wherein the container is flexible-walled, partially liquid-filled, sealed, and the housing is in fluid communication with an interior of a vessel so that liquid from the vessel can enter the housing, wherein the housing is adapted to immobilize the container but to allow a wall of the container to expand and contract laterally due to pressure changes resulting from a net effect of gravity and a buoyant force exerted by the liquid in the housing;
   locating the housing so that a liquid level in the housing varies in a desired relationship to the liquid level in the vessel;
   providing a normally closed valve comprising an inlet connectable to a source of liquid for the vessel and an outlet in fluid communication with the interior of the vessel;
   providing an actuator mechanism for the normally closed valve comprising a first actuator part operable to open the normally closed valve in response to a force provided to the first actuator part by a second actuator part;
   the second actuator part being adapted to engage the wall of the container and to generate a force due to a combined effect of a pressure exerted on the wall of the container from an inside of the container by the liquid in the container due to a gravity force and a pressure exerted on said wall of the container from an outside of the container by the liquid in the housing due to the buoyant force;
   biasing the second actuator part such that the pressure on the wall of the container due to the combined effect of the pressure exerted on said wall of the container from the inside of the container by the liquid in the container due to the gravity force and the pressure exerted on said wall of the container from the outside of the container by the liquid in the housing due to the buoyant force, on the second actuator part, is sufficient for the first actuator part to open the normally closed valve only when the buoyant force is at a minimum level corresponding to a need to refill the vessel.

* * * * *